March 16, 1937.  H. ERNST ET AL  2,074,257
VIBRATING TOOL METALWORKING MACHINE

Filed Jan. 2, 1935  5 Sheets-Sheet 1

INVENTOR.
HANS ERNST
MARIO E. MARTELLOTTI
BY
H. K. Parsons
ATTORNEY.

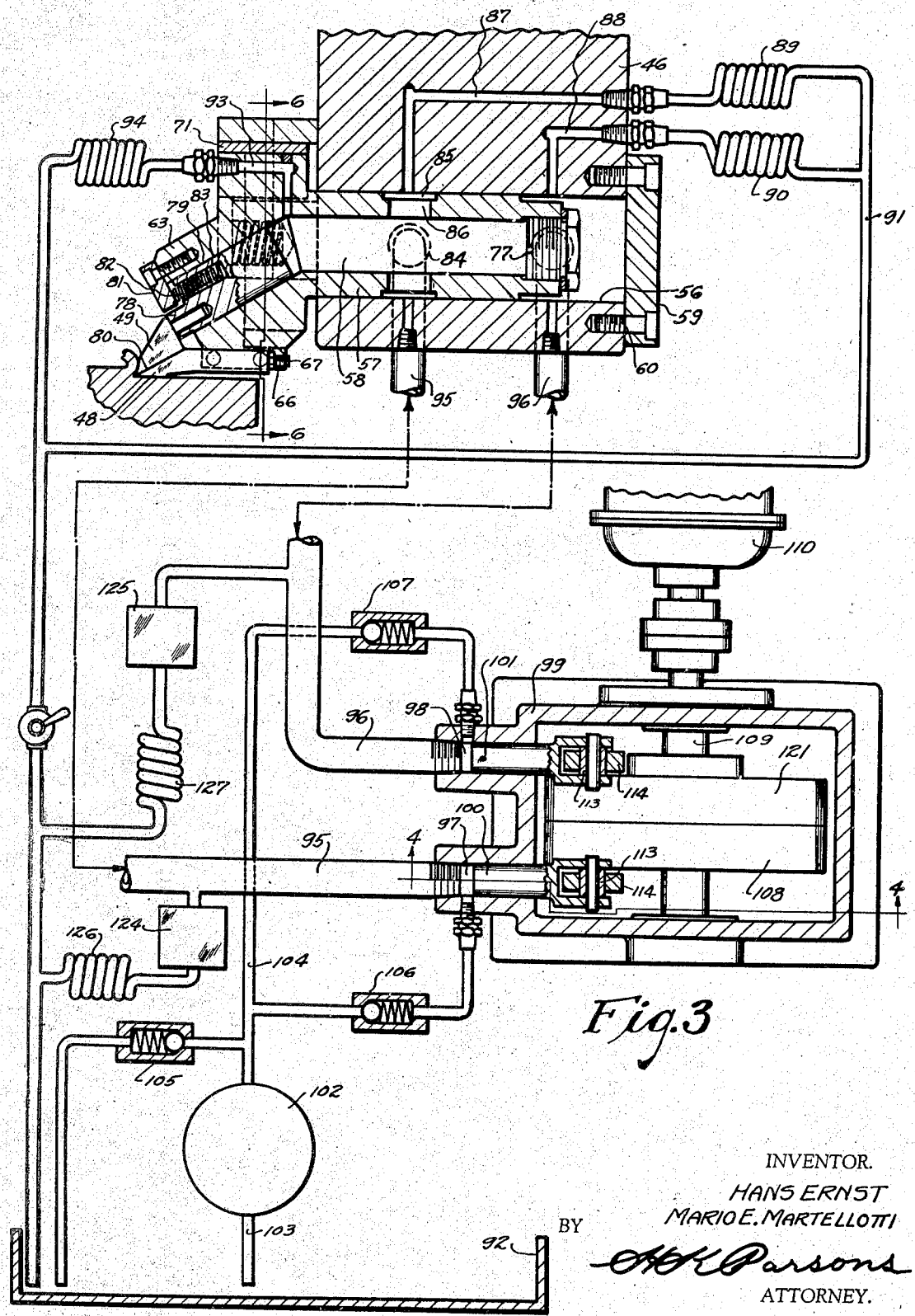

March 16, 1937.  H. ERNST ET AL  2,074,257
VIBRATING TOOL METALWORKING MACHINE
Filed Jan. 2, 1935   5 Sheets-Sheet 3
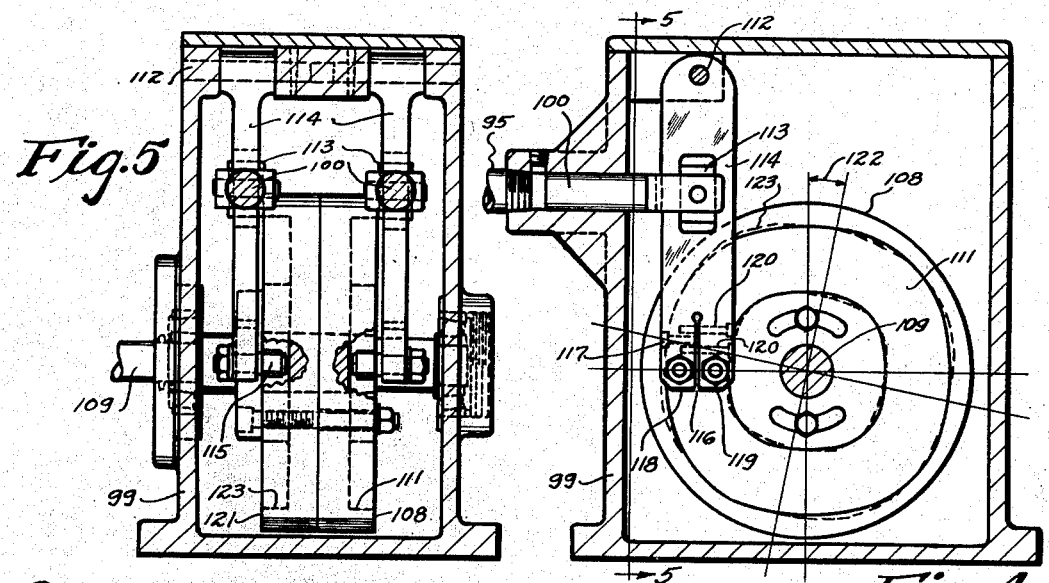
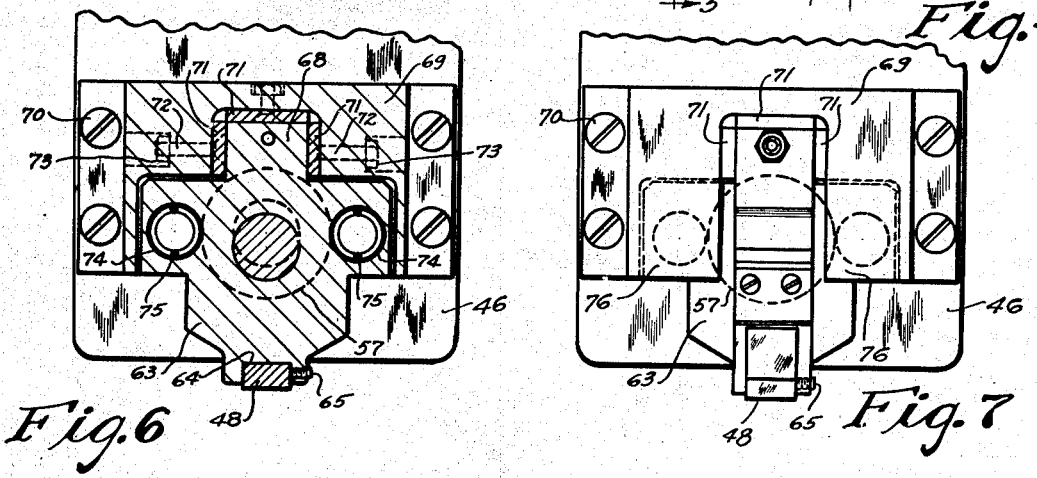
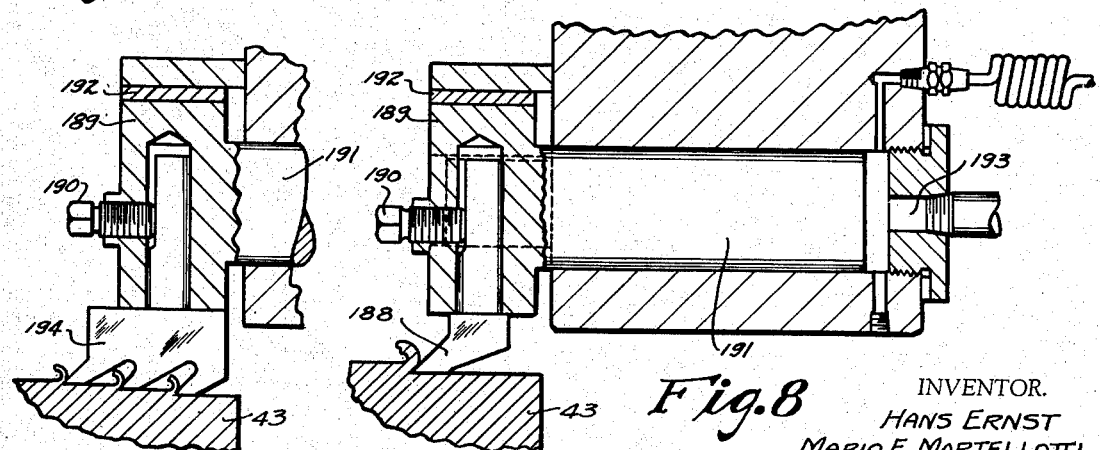
INVENTOR.
HANS ERNST
MARIO E. MARTELLOTTI
BY
*HK Parsons*
ATTORNEY.

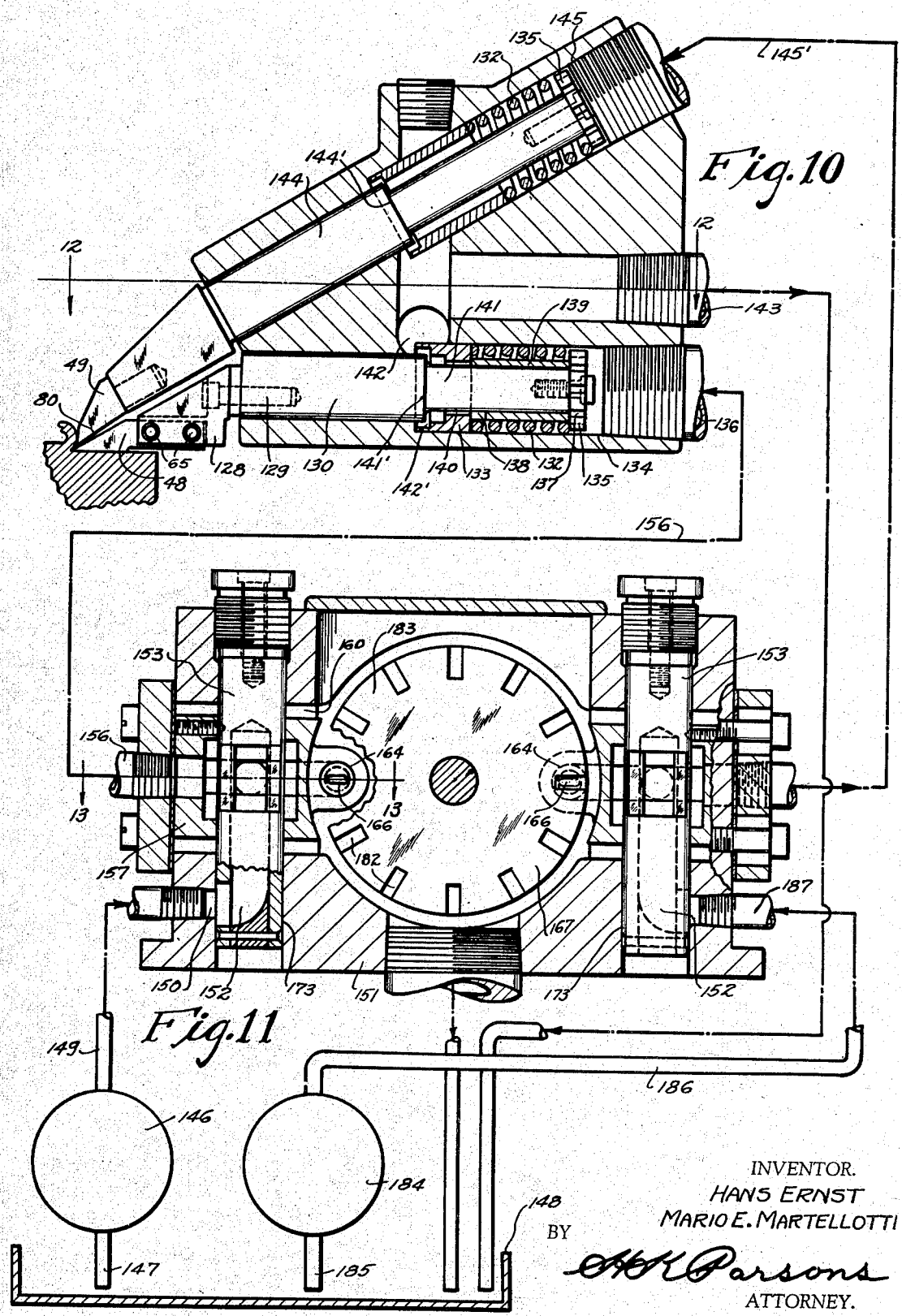

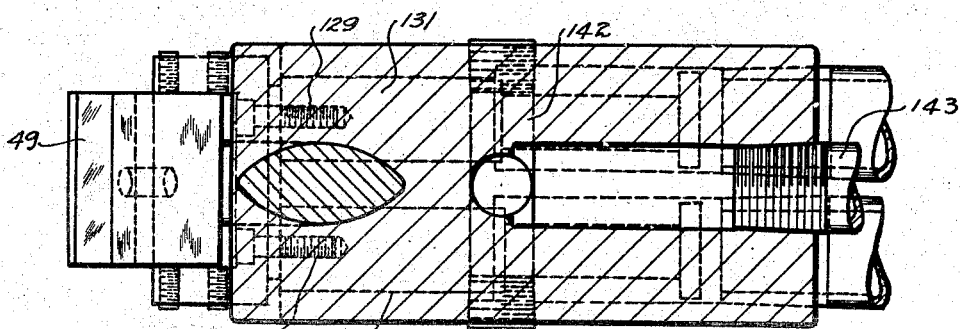
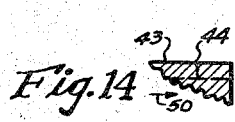
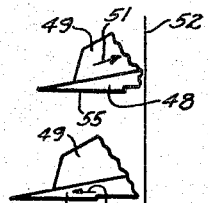
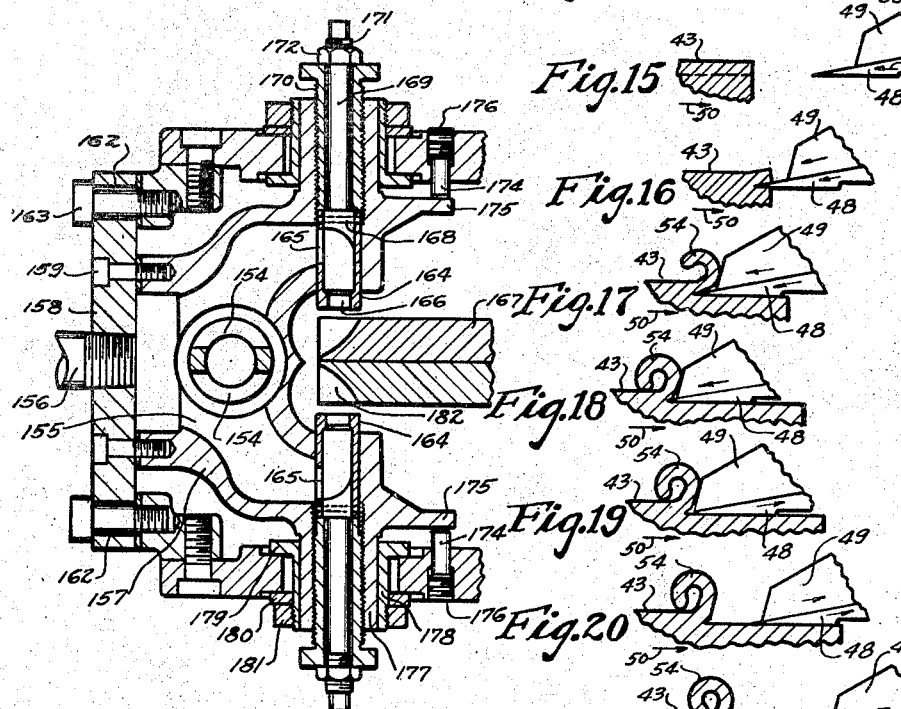

Patented Mar. 16, 1937

2,074,257

UNITED STATES PATENT OFFICE 2,074,257

VIBRATING TOOL METALWORKING MACHINE

Hans Ernst and Mario E. Martellotti, Cincinnati, Ohio, assignors to The Cincinnati Milling Machine Company, Cincinnati, Ohio, a corporation of Ohio Application January 2, 1935, Serial No. 138

14 Claims. (Cl. 90—24)

This invention relates to machine tools and more particularly to precision metal cutting machines.

In the removal of metal with cutting tools, certain well-known difficulties arise which render these tools inefficient, and the results accomplished therewith unsatisfactory from the point of finish obtained.

The inefficiency of such tools arises from the fact that after the cutting edge of the tool becomes imbedded in the metal, it is in continuous contact throughout the cut with the result that a pseudo-cutting edge is built up from the material being removed, and although this edge may be of sufficient hardness it nevertheless does not form an efficient cutting edge whereby the separation of the chip metal from the main body is more of a tearing operation than a true cutting operation. Furthermore, these tools have a large included cutting angle of anywheres from 60 degrees as a minimum to 80 degrees or more, and the abrasive action on the tool surface, in deforming the chip, develops a large amount of heat. Since the cutting edge of the tool is in constant contact with the material, it is impossible to apply a coolant to the edge to prevent over-heating of the same and it also prevents proper lubrication of the surfaces forming the cutting edge, thereby necessitating more power to effect metal removal than would otherwise be necessary.

One of the objects of this invention is to provide a machine for removing metal in an efficient manner and still produce a precision formed and finished surface in one passage between the tool and work.

Another object of this invention is to provide a machine which will remove metal with a minimum of pressure on the work, thereby simplifying work holding fixtures and facilitating the machining of delicate or easily deformable work pieces.

A further object of this invention is to produce a metal removing machine in which the cutting operation is carried out in such a manner that coolant may be efficiently supplied to the cutting edge of the tool whereby the temperature of the entire operation is very low.

An additional object of this invention is to provide a metal working machine in which the component of force opposing the relative movement of work and tool is so small that in many cases the work may be manually moved past the cutter so that light machining operations may be carried out without the use of power feeding means.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 3 is a view showing one form of vibrating cutting tool and the means for effecting vibration thereof.

Figure 4 is a section through the housing shown in Figure 3 as viewed on the line 4—4 thereof.

Figure 5 is a section on the line 5—5 of Figure 4.

Figure 6 is a section on the line 6—6 of the tool holder shown in Figure 3.

Figure 7 is an end elevational view of the tool holder shown in Figure 6.

Figure 8 is a view showing a simplified form of cutter mounting.

Figure 9 is a view illustrating the use of a multiple tooth cutter such as a broaching tool.

Figure 10 is a view of a modified form of tool holder.

Figure 11 is a modified form of hydraulic vibrator.

Figure 12 is a section on the line 12—12 of Figure 10.

Figure 13 is a section on the line 13—13 of Figure 11.

Figures 14 to 22 inclusive are views showing the relative position of the cutting tool and the chip hammer during one vibratory cycle thereof.

Figure 1:
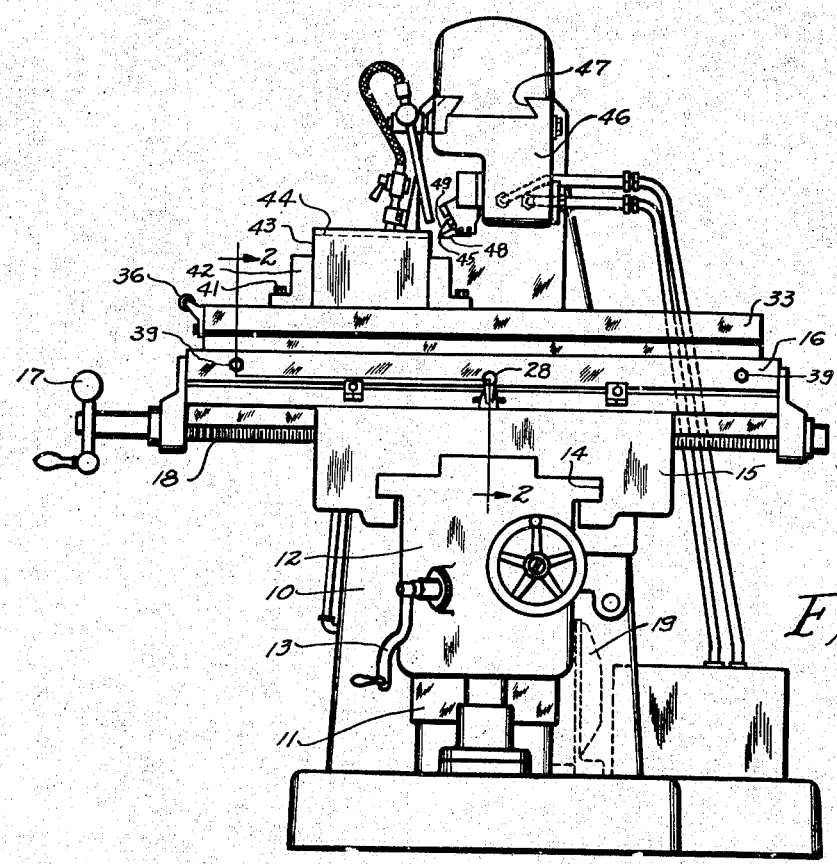
Figure 1 is an elevation of a machine tool embodying the principles of this invention.

A machine which embodies the principles of this invention is illustrated in Figure 1 and comprises a column 10 having vertical guideways 11 upon which is reciprocably mounted a knee 12 which may be moved up and down by manually operable means such as the operating handle 13 which is connected through suitable mechanism not shown for effecting this adjustment.

A horizontal guideway 14 is formed on the top of the knee for receiving and guiding a second support, such as the saddle 15. A sub-table 16 is suitably guided in the saddle for horizontal movement which may be effected manually through rotation of a handle 17 operatively connected to the end of a screw 18 which is threaded in a fixed nut, not shown, but carried by the saddle 15.

Figure 2:
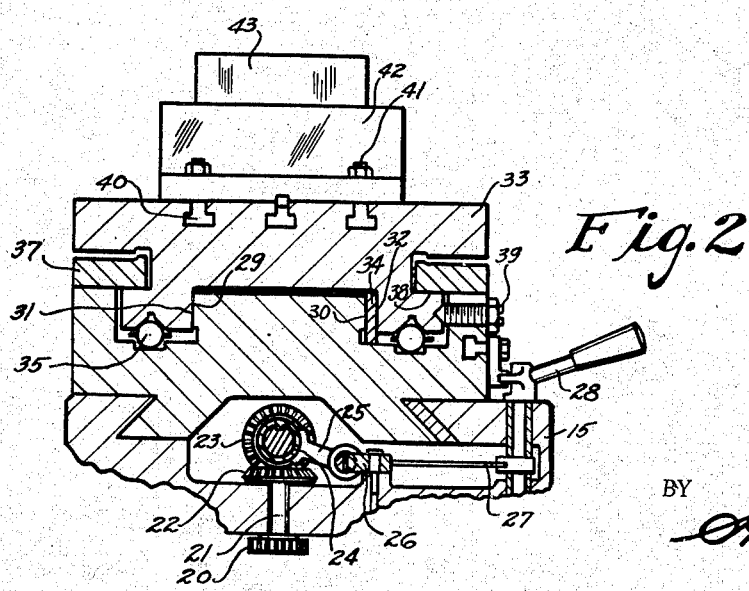
Figure 2 is a section on the line 2—2 of Figure 1 showing the anti-frictionally mounted work table.

The screw may be rotated from a prime mover 19 carried by the column and inter-connected through suitable transmission means to the gear 20 as shown in Figure 2, which is fixed to the end of rotatable shaft 21. This shaft carries at its upper end a bevel gear 22 which inter-meshes with a pair of bevel gears 23 mounted for free rotation co-axially of the lead screw 18. These gears are adapted to be inter-connected with the lead screw through the shiftable clutch member 24 having a shifter fork 25 fixed on the slidable shifter rod 26. This rod may be shifted through suitable inter-connecting means 27 to the manually rotatable handle 28 carried by the saddle.

The sub-table 16 has guide surfaces 29 and 30 formed thereon for inter-engagement with complementary guide surfaces 31 and 32 formed on the under-side of the work support 33. To insure a proper fit, a gib 34 may be interposed between one pair of these complementary surfaces. The weight of the table 33 is transmitted to the sub-support 16 through the agency of anti-friction members 35 which facilitate easy movement of the table 33 and make it possible for the same to be directly pushed manually; and to facilitate this a handle 36 is secured to one end of the table, as more particularly shown in Figure 1. Suitable means, such as flanges 37, may be fitted on the sub-support for engaging surfaces 38 of the table to prevent lifting of the same.

When it is desired to move the work table 33 by the power means described heretofore, the same may be locked to the sub-support by the locking screws 39.

The table 33 has T-slots 40 formed in the top surface thereof in which may be mounted T-bolts 41 for securing work holding fixtures, such as the angle blocks 42, between which a work piece 43 may be secured.

Assuming that a precision finished surface is to be formed on the work in the plane of the dotted line 44 shown in Figure 1, a tool having a cutting edge 45 and carried by a bracket 46 is fixed with the column 10 of the machine as by a dovetailed guideway 47 and the knee vertically adjusted so that this cutting edge lies in the plane of the surface to be formed.

An analysis of cutting action by conventional tools shows that the process of removing material is in reality a combination of two independent functions; viz, first the severing or separation of the chip from the body of the work piece, and second the deformation or distortion of the chip necessary to move it out of the path of the advancing tool. The combination of these two functions in a single tool is a compromise and as such does not permit the tool to either cut or bend the material in the most efficient manner. By the use of a compound tool in which the two functions are performed independently, each function may be performed in the most efficient manner. To this end the tool is provided with two members, one a cutter 48 which performs the function of severing the chip by actual cutting, and the other a chip hammer 49 which performs the function of deforming or bending the chip after it has been separated by the tool 48.

As previously mentioned, conventional precision cutting tools remain in continuous contact with the work throughout the cutting stroke, and this prevents proper lubrication and the attendant advantages to be gained thereby. In the present invention, means have been provided for withdrawing the tool from the work so that the coolant may penetrate to the actual point of cutting. In other words, the cutting tool 48 is oscillated or vibrated during the cutting action in a definite plane relative to the work, and the frequency of this vibration is very high, ranging from approximately a hundred to upwards of a thousand cycles per second or more as the case may require. This is to be distinguished from the conventional, manually guided, non-precision, low frequency, single point vibrating tools, such as air hammers and the like. In order to prevent interference between the two functions of chip severance and chip deformation, the one should preferably be carried out in a different phase relation to the other. In order to understand more fully the manner in which this is accomplished, reference may now be had to Figure 14 to 22 inclusive which represent the various positions of the cutting tool and hammer through one cycle of movement.

In Figure 14 the work piece 43 is assumed to be feeding at a constant rate in the direction of the arrow 50 and at the instantaneous position of the parts the cutter 48 is stopped and the hammer 49 is still retracting in the direction of the arrow 51. For the purpose of more readily understanding the relative position of the parts throughout the remaining figures, a fixed reference line 52 has been drawn and this may be assumed to be drawn on a fixed part of the machine. From the remaining views it will now be seen that the work piece 43 is continuously traveling toward this line, while the cutter and hammer oscillate with respect to this line.

In Figure 15 the cutter 48 has advanced a predetermined amount in the direction of the arrow 53 toward the work and during this same time interval the work piece 43 has advanced toward the line 52. At the same time the hammer 49 has been retracting and has just reached a stop position at the instantaneous position of the parts in this figure. Although the hammer appears to have advanced in comparison with its position shown in Figure 14, this is merely relative due to the fact that the hammer is carried by the support which carries the cutter 48 so that although it has been retracting itself relative to the cutter 48 still at has been bodily moved through space by the cutter support, and the resultant of these two movements is that the hammer is really further from the line 52 than it was in Figure 14.

In Figure 16 the work has advanced another increment of movement toward the reference line 52 and at the same time the cutter has departed from that reference line a sufficient amount to make a small incision in the work. In this figure, the hammer has advanced from its stop position shown in Figure 15 a predetermined amount due to its own movement plus the movement imparted to it by the cutter support and therefore its position is the resultant of these two movements.

In Figure 17 the work has advanced another increment of movement toward the reference line 52 and the cutter 48 has departed further from the reference line 52 thereby entering deeper into the work and forming the clip portion 54. The hammer has followed up the movement of the cutter and deformed this chip portion to a much greater extent than would have been the case had the cutter 48 been acting alone.

In Figure 18 the cutter has reached a position of maximum departure from the reference line 52 and is instantaneously stopped while the hammer has been following up the movement of the cutter and further deforming the chip.

In Figure 19 the cutter has started its return stroke while the hammer has continued its advance and has just reached its stop position.

In Figure 20 the hammer and cutter are retracting and it will be noted they are both retracting at a faster rate than the advancing movement of the work. This allows a coolant or lubricant to enter the cut or incision and properly lubricate the parts for the next cutting stroke. In Figure 21 the cutter and hammer are still returning and in Figure 22 the cutter has reached a stop position which corresponds to its stop position shown in Figure 14, thus completing one cycle of movement. It will be noted in these figures that the cutter has a very small included angle so that its action on the work is a real cutting action and not simply a tearing or ripping action. It will also be noted that the under face 55 of the cutter lies in the same plane as the line 44 which represents the surface to be produced, and that there is no clearance between this face of the cutter and the finished work face which is different from the present practice of providing a clearance ranging from 2 or 5 degrees upwards. It will be noted from Figure 22 that the face 55 will remain in contact with the finished face 44 throughout the remainder of the cut, and the continuous reciprocation of the face 55 upon the face of the work tends to burnish this surface whereby the result is a precision surface as well as a highly finished surface. However, even if a small clearance angle were provided, a highly finished surface would still be produced on the work, due to the absence of any appreciable pseudo-cutting edge with this method of cutting.

The length of stroke of the cutter and the amount of work advanced during a single stroke has been greatly exaggerated in Figures 14 to 22 in order to explain the relative position of the parts during one cycle of operation. As a matter of fact, the cutter and hammer are vibrated at relatively high frequencies as previously suggested, and therefore the length of their stroke is very small.

One manner of supporting and vibrating the tool and hammer is shown in Figure 3 in which the support 46 is shown as provided with a cylindrical bore 56 in which is reciprocably or oscillatably mounted a plunger 57 having a central or axial bore 58. One end of the bore 56 is closed or sealed by the plate 59 which is held in place by a plurality of fillister head screws 60. A plug 62 is threaded in the end of bore 58 of the plunger 57 for closing the end thereof.

The plunger 57 has an enlarged head 63 in the lower side of which is formed a rectangular groove 64 in which is fixed the cutter 48, the same being held therein by set screws 65. One end of the groove is closed by the portion 66 as shown in Figure 3 through which is threaded a set screw 67 for determining the axial position of the cutter.

The member 63 has a rectangular-shaped guide portion 68 which fits into a similar shaped opening in a fixed guide block 69 which is secured to the member 46 as by the screws 70. Suitable adjustable gibs 71 may be inserted between the guide portion 68 and the block 69 and these may be held in position by the flat headed screws 72 having locking nuts 73 on the end thereof. This construction prevents rotation of the plunger 57 and insures that the surface 55 of the cutter will lie parallel to the surface being formed.

The head 57 has a pair of holes 74 drilled in one end face thereof and on opposite sides of the center for receiving springs 75 which abut against flanges 76 carried by the block 69 and which overlap these holes when the block is secured in position. The springs react against these flanges, tending to urge the plunger 57 toward the right as viewed in Figure 3. Reciprocation of the plunger 57 is effected by admitting fluid pressure through the port 77 which acts on the right end of the plunger, moving the same toward the left and compressing the spring. When this pressure drops below the resultant force of the springs the plunger is shifted toward the right. Thus by raising and lowering the pressure at port 57 above and below the capacity of the springs the plunger 57 and thereby the tool 48 will be vibrated and at a rate depending upon the rate at which the hydraulic pressure is varied.

The hammer 49 is secured in the end of a second plunger 78 which is reciprocably mounted in an inclined bore 79 which bore intersects the horizontal bore 58 formed axially of the plunger 57. The hammer is so shaped and held by the plunger that its lower face 80 rides on the top of the upper face of the cutter 48.

An abutment member 81 is secured to the head 68 for engaging one end of a spring 82 which is mounted in a bore 83 formed in the plunger 78 and which acts on the plunger to shift the same in a direction to cause retraction of the hammer. Since the bore 58 is closed by the plug 62 it acts as a cylinder, while the plunger 78 will be moved upon admission of pressure thereto. A port 84 is formed in the support 46 and is always in communication with an annular groove 85 formed on the periphery of the plunger 57 and this annular groove has a pair of opposed radially extending openings 86 formed therein through which fluid pressure is conducted to the bore or cylinder 58 regardless of its longitudinal position. It will now be seen that by having independent sources of pressure at ports 77 and 84 the plunger 57 may be vibrated at any desired frequency and that the plunger 79 may be vibrated at the same or different frequency and in the same or different phase relation relative thereto, whereby the various movements described in connection with Figures 14 to 22 may be obtained. In order to insure that all air is removed from these various spaces so that true results may be obtained, a pair of bleeder channels 87 and 88 are formed in the block 46 and communicating respectively with the annular groove 85 and the space at the right end of bore 56 to permit a constant leakage of oil from these spaces and thereby carry off any air that may accumulate therein. These bleeder channels terminate in bleeder coils 89 and 90 respectively, which can be made of suitable resistance depending upon the amount of bleed found desirable and necessary to eliminate the air from the system and may be made different for each channel. As a matter of convenience, the bleeder coils may be finally connected to a common return channel 91 whereby the escaping oil may be returned to a common reservoir 92. Since air may also collect in the bore 58, an additional bleeder channel 93 may be provided at the point of intersection between bores 58 and 79 and this channel may also terminate in a bleeder coil 94 of suitable resistance.

Vibration of the fluid pressures acting on the tool and hammer may be effected in various ways and one form of accomplishing this is shown in Figure 3. A pair of channels 95 and 96 connect the ports 84 and 77 respectively to ports 97 and 98 of what may be termed the pressure wave generator 99. The ports 97 and 98 are in the form of cylinders in which are reciprocably mounted the pistons 100 and 101 respectively. These cylinders are supplied with fluid from a constant delivery pump 102 which has an intake 103 through which fluid is withdrawn from the reservoir 92 and delivered under pressure into the channel 104. The channel 104 has a by-pass relief valve 105 connected thereto through which excess fluid may be returned to reservoir. This channel also has connected thereto a pair of check valves 106 and 107 through which fluid is delivered to cylinders 97 and 98 respectively when the pressure therein drops below the pressure in channel 104. The pump 102 therefore serves to maintain the entire system filled with oil under a predetermined pressure determined by the setting of the relief valve 105.

If the channel 96 and the parts supplied thereby are filled with oil and then the piston 101 be suddenly moved toward the left as viewed in Fig. 3, it will be apparent that a wave of higher pressure than that determined by pump 102 will be propagated through the line 96, and if the value of this pressure wave is higher than the reaction provided by the springs 75 an oscillation of the cutter 48 will be effected. Similarly a movement of the piston 100 toward the left will propagate a pressure wave through the line 95 and cause an oscillation of the hammer 49. Means have therefore been provided for oscillating the plungers 100 and 101 at a relatively high frequency in order to produce a rapid succession of pressure waves and thereby a vibration of the desired parts.

The mechanism for oscillating the plunger 100 is shown in Figure 4 and comprises a cam 108 which is secured for rotation to the shaft 109 which in turn is driven by suitable power means such as a motor 110 as shown in Figure 3. The cam 108 has a cam groove 111 which is so shaped as to cause a desired number of reciprocations of plunger 100 for each revolution of the cam. In the present construction, it is so shaped as to produce four reciprocations for each revolution.

The plunger 100 is pivotally connected by the pin 112 and sliding block 113 to the swinging arm 114 which has secured to its lower end a pair of rollers 115. One of these rollers engages the outer periphery of the cam groove and the other roller engages the inner periphery of the cam groove and by means of this construction all lost motion may be taken up between the cam groove and rollers, and furthermore adjustment may be made for wear. In order to provide for this adjustment the arm 114 has a slot 116 cut in the end thereof between the two rollers so that each is supported by a separate portion. An adjusting screw 117 is threaded in a portion such as 118 with its end engaging the other portion 119 so that upon rotation of the screw in one direction the portions may be separated and thereby the rollers moved further apart. The amount of this adjustment may be controlled by a pair of screws 120 which are also threaded in the portion 118 but having sliding fit in the portion 119.

The same construction is utilized for reciprocating the plunger 101 as will be seen from Figure 5 with the exception that the cam 121 is mounted on the shaft 110 in out-of-phase relation with cam 108, the amount of this out-of-phase being represented by the acute angle 122. This changes the position of the cam groove 123 which is represented by dotted lines in Figure 4 relative to the cam groove 111 so that the movements of plungers 100 and 102 may be independent of one another and in such relation as to produce the cycle shown in Figures 14 to 22 inclusive.

In order to provide for the contingency that more energy might be put into the system by the pressure wave generating pistons than is absorbed by the receiving pistons whereby reflected waves might be formed which will cause an accumulation of energy and thereby an increase in the maximum pressure to a point that will cause bursting of the pipes, means have been provided in the form of closed vessels 124 and 125 connected respectively to channels 95 and 96 and of much greater volume than the displacement of the pistons to absorb this excess energy and permit the same to gradually leak away through resistance coils 126 and 127 respectively to reservoir.

Another embodiment of the invention is shown in Figures 10 to 13 inclusive, in Figures 10 and 12 of which is shown a different form of supporting the cutter and hammer for vibration, and in Figures 11 and 13 is shown a different form of pressure wave generator.

Referring to Figure 10, the cutter 48 is supported in a head 128 in a similar manner as before, but the head is attached as by screws 129 to the end of a pair of plungers 130 and 131 which thereby does away with the necessity of providing guiding means to prevent oscillatory movement of the tool out of the plane of the surface to be formed which was necessary in the previous construction where only one piston was utilized. Each of the plungers 130 and 131 is provided with a spring 132 interposed between the closed end 133 of bore 134 and an enlarged disk 135 secured to the end of the plungers. The spring tends to retract the tool and the admittance of hydraulic pressure through port 136 tends to advance the tool. The disk 135 has a plurality of small axially-extending grooves 137 provided in its periphery to permit a slight leakage past the same which will find its way to an opening 138 in the sleeve 139 and thereby through the space 140 existing between the reduced shank 141 of the plungers and the member 133 to the bore 142 which is connected by inter-drilling to the exhaust port 143. This insures that air will not become entrapped in the system and provides a means for conducting any air, that may accumulate therein, out of the system.

This construction also acts as a relief valve in the sense that when there is no load on the cutter, and the pressure has only the resistance of the spring to overcome, the plunger 130 will gradually be moved to the left and as it does, the shoulder 141' withdraws from shoulder 142' and opens up a gap permitting a freer escape of oil to bore 142. However, when a load comes on the cutter and the plunger 130 is moved toward the right, the space between these shoulders is decreased, thereby increasing the resistance to flow and raising the pressure on the end of the plunger. Thus the resulting action is to decrease the pressure on the plunger when there is no load, and immediately increase it when there is a load.

The hammer 49 is connected to the end of a single plunger 144, it not being necessary to provide two plungers to prevent inadvertent oscillation of the hammer because the straight edge thereof will be prevented from rotation on each forward stroke by the plane upper surface 80 of the cutter 48. The plunger 144 is fitted in a similar manner as plungers 130 and 131 with a spring 132 and a disk 135 secured to the end thereof for receiving pressure from the spring. Fluid pressure is admitted to the bore 145 for the purpose of moving plunger 144 against the resistance of spring 132. The shoulder 144' performs the same function as shoulder 141'.

An alternative form of pressure wave generator is shown in Figure 11. In this case a train of pressure waves is propagated through each of the lines 156 and 145' by alternately damming up and releasing the flow from the constantly discharging pumps 146 and 184.

The pump 146 has an intake 147 through which fluid is withdrawn from a reservoir 148, and is connected through a pipe 149 to port 150 of the pressure wave generator 151. This port communicates with a bore 152 formed in a sleeve 153 which has cut-away portions 154 on opposite sides thereof to form a port through which the fluid is delivered to the space 155 as more particularly shown in Figure 13. This space is connected by a pipe 156 to the port 136 of the cutter plunger cylinders. The sleeve 153 is supported in an adjustable member 157 which has a plate 158 secured thereto as by screws 159. The plate is sufficiently large to cover the opening 160 in the frame 161 into which the member 157 is inserted. The plate has a pair of elongated holes 162 on each side thereof through which pass the clamping bolts 163. The member 157 has a pair of sleeves 164 which are in axial alignment and each of which has an opening 165 which communicates to the space 155 and a port 166 in the end thereof which lies adjacent the wheel 167. The sleeve 164 is secured as by a pin 168 to a bolt 169 which passes through an elongated sleeve 170 which is threaded into the member 157. The end of sleeve 170 engages the end of sleeve 164 so that upon rotation of sleeve 170 the sleeve 164 and thereby its port 166 may be adjusted toward and from the wheel 167 and determine the space or opening between the end of the sleeve and the side of the wheel. The bolt 169 has a threaded end 171 upon which is mounted a nut 172 for holding the sleeve 164 against the end of the sleeve 170.

In addition to providing individual adjustment of the sleeves 164 relative to the wheel 167, means have been provided for adjusting the member 157 laterally so that the sleeve 153 will be lined up with a bore 173 in which it is slidable. This means comprises a pair of pins 174 which engage lugs 175 projecting from member 157 and pick-up screws 176 for locking the parts in position. The frame 157 is vertically adjustable relative to the sleeve 153 to position the port 166 vertically while the individual adjustment takes care of adjustment horizontally. By loosening the locking screws 163 the member 157 may be moved up and down and to prevent leakage from the interior of the generator the member 157 is provided with trunnions 177 which extend through bushings 178 having an inner flange 179 and an outer washer 180 which is acted upon by the annular nut 181 for securing the trunnion in place after vertical adjustment.

The wheel 167 has a plurality of sector-shaped notches 182 cut in the periphery thereof whereby the fluid escaping from port 166 will flow in stream line form to exhaust and prevent undesirable reactions on the wheel. From this it will be seen that the pump 146 will fill the entire system full of oil under a predetermined pressure depending upon the rate of escape through the ports 166. When a space on the wheel 167, such as 183, is opposite the ports 166, the rate of escape through ports 166 is materially reduced so that the pressure at this point will rise and a pressure wave be propagated through the pipe 156.

A similar system is provided for causing vibration of the hammer and comprises a pump 184 having an intake 185 and a delivery channel 186 connected to port 187 of the generator 151. A similar construction as that shown in Figure 13 is utilized for propagating a pressure wave in the line 145' leading to the hammer. If it is desired that the hammer oscillate out of phase with the cutter, then the adjustable member 157 is raised or lowered depending upon the relationship desired between the phase of operation of the hammer and that of the cutter. Although the details of construction are different it will be seen that the same general principle is utilized in that a column of fluid acts on a plunger and that pressure waves are created in the column of fluid to cause vibration of the part.

In taking light cuts it may not be necessary to utilize the hammer whereby only a cutter such as 188 shown in Figure 8 may be utilized, and this may be secured in a head 189 as by a set screw 190 the head being integral or otherwise connected to a piston 191 and held against rotation by a suitable guide 192. Either form of pressure wave generator may be utilized for delivering fluid to the port 193 for causing oscillation of the plunger. In this case retraction of the plunger may be effected by springs acting on ears projecting from opposite sides of the head 189 similar to the construction shown in Figures 6 and 7. By means of this construction, different forms of tools may be substituted for the tool 188 such as a multiple cutting tool 194 as shown in Figure 9 which may be similar to a broaching tool.

There has thus been provided an improved form of metal working machine in which precision formed surfaces of high finish may be produced in an efficient manner with an economical expenditure of power and in a single pass between the tool and the work, eliminating the necessity of a subsequent operation to smooth or finish the desired surface.

What is claimed is:

1. A machine tool having a work support, a tool support, a cutter mounted in said tool support for feeding movement relative to the work support, said cutter having a small acute angular cutting edge for making incisions in the work, a hammer mounted in adjacent relation to said edge for entering the incision and deforming the metal, and means to vibrate the hammer and the tool in different phase relation during feeding movement of the work support, including separate hydraulic channels leading to the hammer and tool respectively and a generator for alternately creating pressure waves in said channels.

2. In a machine tool having a work support and a cutting tool having a small acute-angled cutting edge, the combination of means for advancing the work support past the tool at a constant feeding rate, means to reciprocate the cutting edge at a faster rate than said feeding rate whereby the cutting edge will alternately penetrate the work and withdraw therefrom, and means to supply a coolant to the tool whereby during withdrawal of the tool from the work the coolant will enter the incision so that the metal removing operation may be carried out at relatively low temperatures.

3. A vibratory cutter for machine tools comprising a housing, a movable member mounted in the housing and carrying a metal cutting tool, resilient means for moving the member in one direction, hydraulic means for urging the member in an opposite direction, and means for rapidly changing the pressure of said hydraulic means to effect vibration of the tool.

4. A metal cutting tool comprising a housing having means for attachment to a machine tool in prescribed relation to a work support, a member movably mounted in the housing for supporting a cutting tool, means to effect sudden impacts between the tool and work, a hammer movably mounted in said housing for entering the incisions alternately with respect to the tool to deform the metal to be removed, and means to cause the hammer and tool to vibrate in predetermined out-of-phase relation with one another, including fluid operable vibrators individual to the hammer and tool, and means to deliver pressure alternately to said vibrators whereby they will be actuated in out-of-phase relation.

5. A vibratory tool for producing precision surfaces in machine tools comprising a housing, a piston member slidable in said housing and carrying a metal cutting tool, resilient means acting axially on said piston member, means to produce an opposing hydraulic pressure on said piston, and means for effecting sudden changes in said pressure above and below the pressure of said resilient means to effect vibration of said tool.

6. A vibratory cutter having a housing adapted to be attached to a machine tool, a piston slidably mounted in said housing carrying a cutting tool, resilient means acting axially of said piston to move the tool in one direction, a source of hydraulic pressure connected to act constantly on the end of said piston in opposition to said resilient means, and means to effect sudden increases in said pressure to cause vibration of the tool.

7. A vibratory cutter having a housing adapted to be attached to a machine tool, a piston slidably mounted in said housing carrying a cutting tool, resilient means acting axially of said piston to move the tool in one direction, a source of hydraulic pressure connected to act constantly on the end of said piston in opposition to said resilient means, the resultant of said hydraulic pressure being greater than the pressure of said resilient means, and means to cause sudden drops in the hydraulic pressure to cause vibration of said tool.

8. A vibratory cutter having a housing adapted to be attached to a machine tool, a piston slidably mounted in said housing carrying a cutting tool, resilient means acting axially of said piston to move the tool in one direction, a source of hydraulic pressure connected to act constantly on the end of said piston in opposition to said resilient means, the resultant of said hydraulic pressure being greater than the pressure of said resilient means, means to cause sudden drops in said pressure to cause vibration of said tool, said means including a rotary disk, and means on said disk for periodically connecting said pressure to exhaust.

9. A metal working tool having a housing, a reciprocable plunger mounted in the housing, a cutting tool carried by said plunger, said tool having a small acute-angled cutting edge, the face forming one side of said angle being adapted to lie in the plane of the surface to be formed in the work by said cutting edge, and power operable means effective on said plunger to effect vibration of the tool whereby the edge will sever the metal to be moved and the face will burnish the formed surface of the work.

10. A vibratory tool for precision machine tools including a fluid reciprocable member, a cutting tool carried by said member, means to maintain a column of fluid in pressure contact with said member, means to vibrate said column of fluid, and a high resistance fluid leak for removing air from said column of fluid.

11. In a machine tool, the combination of a work support, a tool support, a cutter mounted on the tool suupport and bodily movable relative thereto, fluid pressure means for absorbing the entire reaction of the cutter under cut, and means to vary said pressure to cause vibration of the cutter during relative movement between the work support and tool support.

12. In a machine tool, the combination of a work support, a tool support, a tool supported for free bodily movement in a direction parallel to the direction of feeding movement of the work support, fluid pressure means for restraining free movement of the tool, and means to vary said pressure means to cause vibration of the tool during feeding movement of the work support.

13. In a precision machine tool, the combination of a work support guided for precision rectilinear movement, a tool support, a tool having a shank also guided for precision rectilinear movement parallel to the first-named movement, opposed pressure means acting to cause opposite movement of the tool shank, and means to alternately differentiate said opposing pressures to cause vibration of the tool during movement of the work support to produce a precision surface on the work.

14. In a machine tool, the combination of means for forming a precision surface on a work piece by removing the metal in ribands comprising a metal working tool having a cutting edge substantially equal to the width of the riband, means to support the tool for movement in a direction parallel to the surface to be formed whereby the cutting edge will be in continuous contact with the work, fluid operable means for reciprocating the tool during relative movement between the work support and the tool support to effect alternate cutting and burnishing operations, and means to effect a lateral shifting movement between the tool and work to reposition the parts for subsequent removal of another riband.

HANS ERNST.
MARIO E. MARTELLOTTI.